(12) United States Patent
Li et al.

(10) Patent No.: US 6,519,134 B1
(45) Date of Patent: Feb. 11, 2003

(54) UNIVERSAL CAPACITOR TERMINAL DESIGN

(75) Inventors: Yuan-Liang Li, Chandler, AZ (US); David G. Figueroa, Mesa, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/619,088

(22) Filed: Jul. 19, 2000

(51) Int. Cl.[7] .............................................. H01G 4/228

(52) U.S. Cl. ................... 361/306.1; 361/321.1; 361/321.5; 361/306.3; 361/311

(58) Field of Search .......................... 361/306.1, 301.2, 361/301.4, 302–304, 306.2, 306.3, 321.5, 321.1, 321.4, 311, 313, 320

(56) References Cited

U.S. PATENT DOCUMENTS

| 4,223,786 | A | * | 9/1980 | Hori ............................ 206/330 |
| 5,590,017 | A | * | 12/1996 | Kelso ......................... 361/321.4 |
| 5,629,240 | A | * | 5/1997 | Malladi et al. .............. 438/106 |
| 5,652,693 | A | * | 7/1997 | Chou et al. ............... 361/306.1 |
| 6,005,538 | A | * | 12/1999 | Hoekstra ...................... 345/47 |
| 6,201,684 | B1 | * | 3/2001 | Kobayashi et al. ......... 361/311 |

* cited by examiner

Primary Examiner—Anthony Dinkins
Assistant Examiner—Nguyen Ha
(74) Attorney, Agent, or Firm—Schwegman, Lundberg, Woessner & Kluth, P.A.

(57) ABSTRACT

A design for capacitor terminals that includes connections to lowermost power and ground plates located within the bottom perimeter of the capacitor itself, for reducing loop inductance. The capacitor is particularly useful in combination with a circuit board, and especially in the power delivery system for a microprocessor.

10 Claims, 3 Drawing Sheets

UNIVERSAL CAPACITOR TERMINAL DESIGN

TECHNICAL FIELD

This invention concerns the design of capacitors.

BACKGROUND

Capacitors are used for many purposes in electronics. One common purpose is the delivery of power at low inductances and high speeds. A typical application of this is the delivery of power to microprocessors. In one approach, discrete capacitors are mounted on the surface of a package carrying the microprocessor, using standard surface mount and reflow processing techniques. Discrete capacitor leads and long current loops may drive inductance to levels above maximum limits for acceptable microprocessor performance, because high inductance slows the rise times of signals and contributes to voltage fluctuations that ultimately slow down microprocessor speed.

Also, as microprocessor clock speeds increase, the interaction between capacitors and the power or ground plates of a package, interposer, or board on which they are mounted becomes vitally important to the performance of the microprocessor power delivery system.

DETAILED DESCRIPTION

The inventors have found that the performance of a power delivery system for microprocessors depends on the spacing between the lowest metal plate in the capacitor and the surface to which the capacitor is attached. In general, a smaller spacing produces a lower loop inductance value; but, in practical application using a discrete capacitor, the spacing varies due to the solder technique and the flatness of the attached surface as well as that of the capacitor. This variation in spacing makes the design of an efficient power delivery system very difficult to optimize. The inventors have found that the minimum spacing achievable using conventional techniques is approximately four thousands of an inch (0.1 millimeter). The invention reduces the effective spacing between the lowest metal plate in the capacitor and the surface even further than the conventional techniques.

Figure 5:
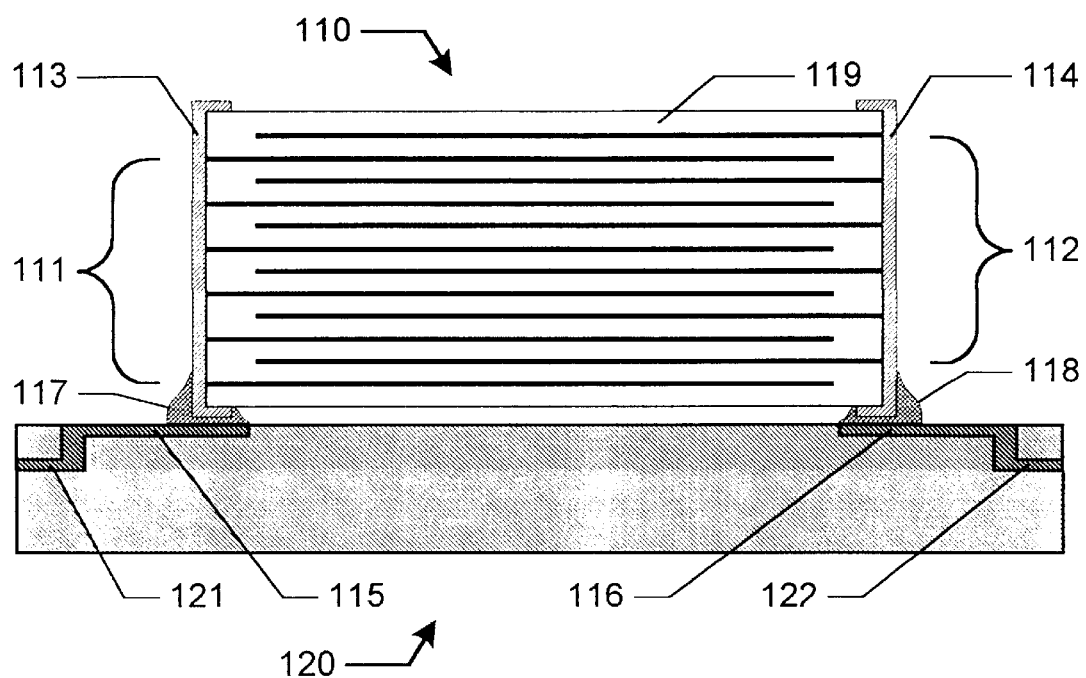
FIG. 5 is a schematic side cross section view of a prior art capacitor.

To place the invention in context, FIG. 5 shows a prior art capacitor 110 mounted to a prior art circuit board 120. Electrical pads 115 and 116 are mounted on or within circuit board 120 in any conventional manner; as illustrated, pads 115 and 116 are connected to power source 121 and ground reference 122, respectively, which are attached to circuit board 120.

Capacitor 110 comprises two alternating groups of multiple conductive plates 111 and 112, all surrounded by dielectric material 119. Side electrodes 113 and 114 connect all members of each of the respective group of alternating plates 111 and 112 to each other. Thus, capacitor 110 is the electrical equivalent of a group of capacitors, each comprising one plate 111 and one plate 112, all arranged in parallel so that their individual capacitance values add up to the capacitance value of capacitor 110. Side electrodes 113 and 114 also extend outside the main body of capacitor 110 so that it is possible to attach capacitor 110 both mechanically and electrically to electrical pads 115 and 116 by creating solder joints 117 and 118, respectively, where electrical pads 115 and 116 contact the bottom faces of side electrodes 113 and 114. As noted above, variation in solder joints 117 and 118, along with variations in the flatness of electrical pads 115 and 116 and the bottom faces of side electrodes 113 and 114, all combine to affect the distance between capacitor 110 and power source 121 and ground reference 122.

Figure 1:
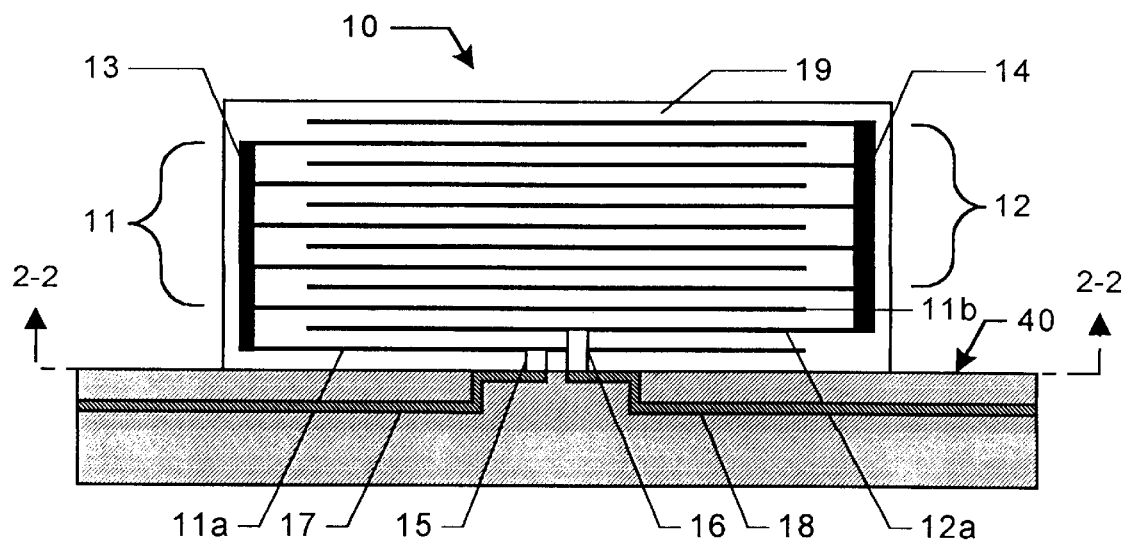
FIG. 1 is a schematic side cross section view of a capacitor according to the invention.
Figure 2:
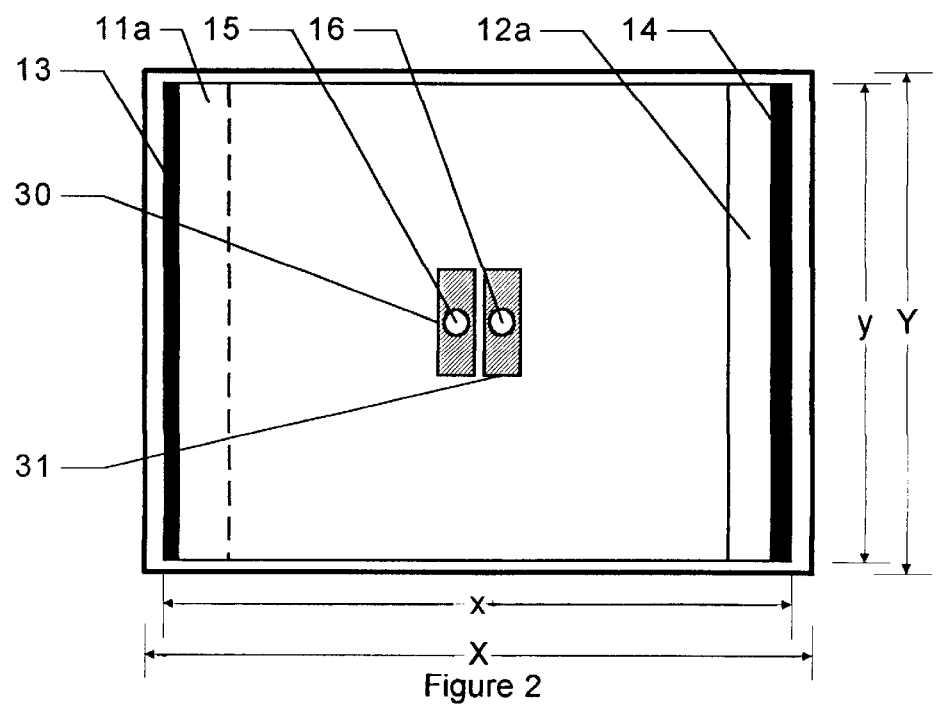
FIG. 2 is a schematic bottom cross section view of the embodiment of FIG. 1, taken along the line 2—2.

As shown in FIGS. 1 and 2, a capacitor 10 according to this invention also comprises two alternating groups of multiple conductive plates 11 and 12, all surrounded by dielectric material 19. Side electrodes 13 and 14 connect all members of each of their respective alternating groups of conductive plates 11 and 12 to each other. However, as opposed to prior art capacitor 110, side electrodes 13 and 14 of capacitor 10 do not extend outside the main body of capacitor 10. Capacitor 10 is mounted to circuit board 40 using conventional solder bump and reflow techniques.

Capacitor 10 further defines electrical connections, illustrated as vias 15 and 16, so that the power plate 11a and the ground plate 12a of each alternating group that are each "lowest" (i.e., closest to circuit board 40) may be electrically connected to conductive surfaces such as their respective power source 17 or ground reference 18. All that is required is that vias 15 and 16 be within the perimeter of the cross section of capacitor 10 (i.e., the largest rectangle shown in FIG. 2, with longer dimension "X" and shorter dimension "Y"). It is desirable that vias 15 and 16 be located within the perimeter formed by the lowest power plate 11a and the lowest ground plate 12a, respectively, including side electrodes 13 and 14, (i.e., the slightly smaller rectangle shown in FIG. 2, which has longer dimension "x" and shorter dimension "y"). It is even more desirable that vias 15 and 16 be located at or near the center of the perimeter of capacitor 10.

FIG. 2 also shows two pads 30 and 31 that surround the entrances to vias 15 and 16, respectively. Only a single via is shown on each of the two pads, but this is only an example and not a limitation on the scope of the invention. The number of vias, and the size of the pad required to accommodate them, are determined by the manner in which capacitor 10 is manufactured, and the particular application for which capacitor 10 is intended, in accordance with known principles in the art. For example, it is possible to manufacture vias 15 and 16 using a conventional drilling process that can produce vias of approximately five hundred micron diameter, or a laser drilling process that can produce vias of approximately two hundred micron diameter. The latter process would be desirable from the standpoint of permitting more vias to be used on a capacitor of a given surface area, but it would not be desirable from the standpoint of cost. For a given capacitance value, which would be determined at least partially by the application for which the capacitor was intended, either process would lead to design rules that specified the closest spacing, or pitch, between immediately adjacent vias, the number of vias required to accommodate the current flowing through the capacitor, etc. In general, there should be as many vias 15 and 16 as possible, given the design rules applicable to the situation.

The location and structure of vias 15 and 16 and their respective electrical connections lead to several improved features of capacitor 10 and any circuit in which it is used.

First, the distance from the electrical equivalent of the nearest conductive surface to the electrical equivalent of capacitor 10 is not the distance between the lowest power plate 11a and the ground reference 18. Instead, it is the considerably smaller distance from power plate 11b to ground plate 12a. The latter distance is on the order of 0.3 thousandths of an inch and, as noted before, the former is on the order of 4.0 thousands of an inch. This extremely small spacing drastically reduces the loop inductance value of capacitor 10.

Second, the combination of pads 30 and 31 and vias 15 and 16 permit simple placement of probes on the bottom side of capacitor 10 while it is electrically connected to circuit board 40. This permits measurement of parameters and the characterization of all extremely low embedded series inductance (ESL) or embedded series resistance (ESR) capacitors, without using a test fixture or a de-embedding method.

Figure 3A:
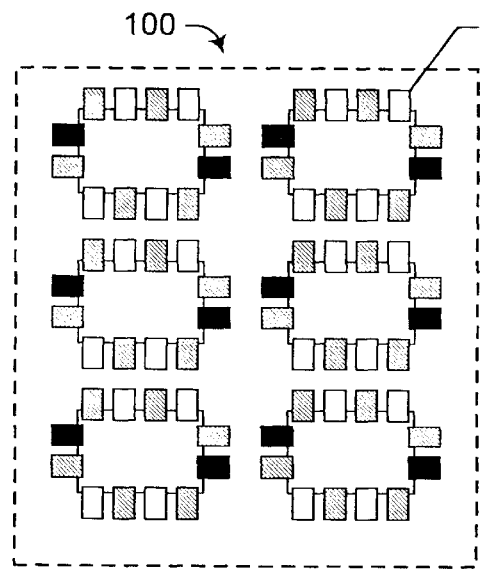
FIG. 3A is a schematic view of a prior art arrangement of capacitors in a given area.

Third, the placement of pads 30 and 31 on the exterior lower surface of capacitor 10, as shown in FIG. 2, instead of on the exterior sides of capacitor 10, reduces the total amount of area required to place capacitor 10 onto a circuit board or other surface. This leads to a more efficient and cost-effective use of components than in the prior art. For example, FIG. 3A is a schematic view of a prior art arrangement on a component package of six capacitors 100, each of which has twelve externally arranged pads 130. Because pads 130 extend beyond the boundaries of capacitors 100, the arrangement in a finite area is not a particularly efficient use of area.

Figure 3B:
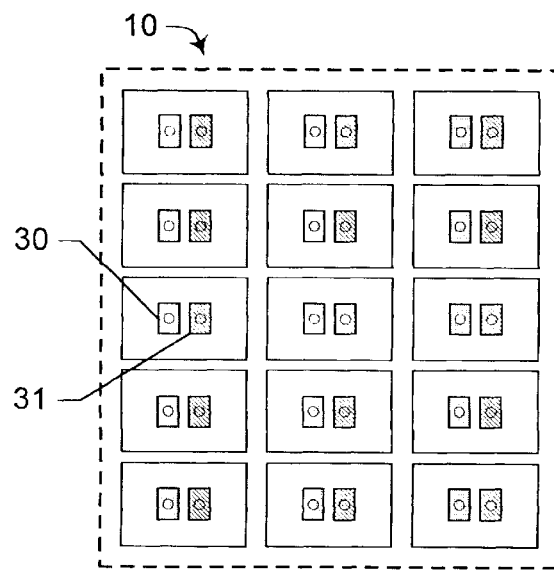
FIG. 3B is a schematic view of an arrangement of the inventive capacitors in the same area as that of FIG. 3A.

By comparison, FIG. 3B is a schematic view of an arrangement of fifteen equally sized capacitors 10 according to the invention, arranged into the same area as that of FIG. 3A. Because pads 30 and 31 are located entirely within the boundaries of capacitors 10, the arrangement in the same area is an extremely efficient use of area.

Figure 4:
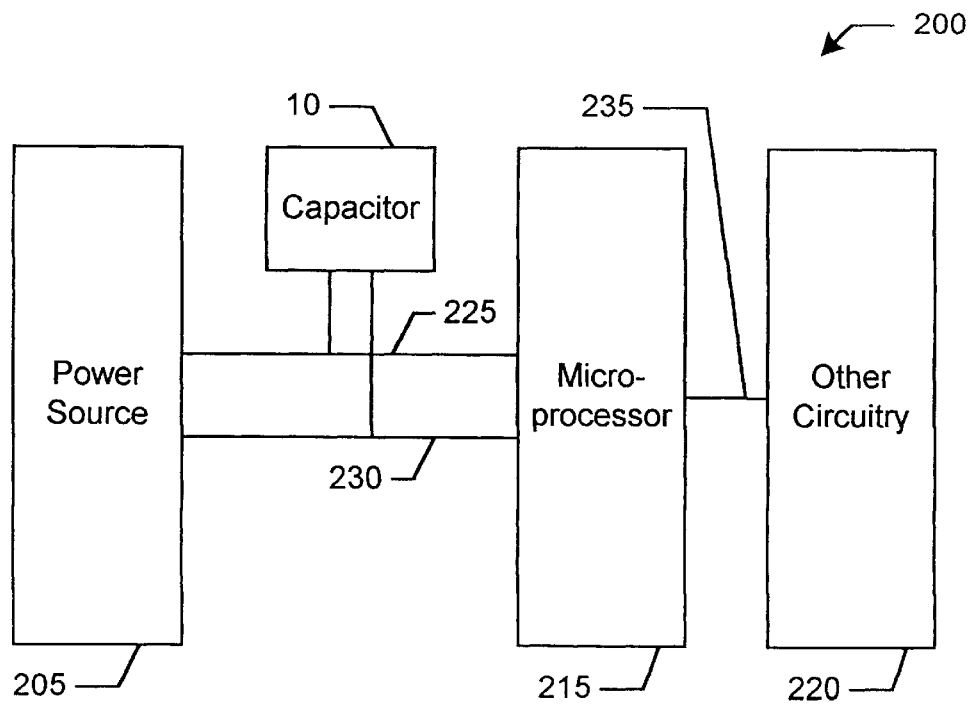
FIG. 4 is a block diagram of a microprocessor-based system using the inventive capacitor.

The invention is suitable for multi-layer ceramic capacitors or any similarly structured capacitor used for any purpose. The preferred use is illustrated in FIG. 4, which schematically shows a microprocessor-based system 200 that comprises power source 205, capacitor 10, microprocessor 215, and other circuitry collectively identified as 220. Power source 205 provides voltage at some appropriate electrical potential between two conductors 225 and 230 that connect power source 205 to microprocessor 215. Capacitor 10 is connected in parallel with conductors 225 and 230 and acts as a "decoupling" or "leveling" capacitor to compensate for voltage fluctuations that may occur for a variety of known reasons not relevant here.

Microprocessor 215 operates with other circuitry 220 in whatever manner is appropriate to the situation, the scope of which is not limiting to the invention in any manner. The connection between microprocessor 215 and other circuitry 220 is indicated collectively by connection 235 with the understanding that this symbolizes any number and type of connection, whether a single connection, a bus, a multiplexed connection, data connections, signal connections, etc., in accordance with standard microprocessor system designs; and that the number and scope of such connections do not limit the invention in any manner.

Electronic components such as the inventive capacitor, microprocessors, and circuit boards can be oriented in virtually any direction without loss of function. Thus, as used in the entire disclosure above, the terms "lower," "lowest," etc. identify directions relative to the circuit board to which the components are mounted, as illustrated by the Figures, regardless of the absolute orientation of the components or circuit board.

We claim:

1. A capacitor comprising a group of multiple power plates alternating with a group of multiple ground plates, the group of multiple power plates including a lowest power plate and the group of multiple ground plates including a lowest ground plate; for each group of alternating plates, a side electrode connecting all members of each respective group of alternating plates to each other, the dielectric material surrounding both groups of alternating plates and the side electrode for each respective group of alternating plates; at least one electrical connection within the perimeter of the cross section of the capacitor to the lowest power plate; and at least one electrical connection within the perimeter of the cross section of the capacitor to the lowest ground plate, in which the electrical connections to each of the lowest power plate and the lowest ground plate are located within the perimeter formed by the lowest power plate and the lowest ground plate.

2. The capacitor of claim 1, in which the electrical connections are located near the center of the perimeter of the capacitor.

3. In combination: a capacitor, comprising a group of multiple power plates alternating with a group of multiple ground plates, the group of multiple power plates including a lowest power plate and the group of multiple ground plates including a lowest ground plate, a side electrode for each group of alternating plates that connects all members of each respective group of alternating plates to each other, the dielectric material surrounding both groups of alternating plates and the side electrodes; and a circuit board comprising a power conductor and a ground reference, each connected within the perimeter of the cross section of the capacitor to the respective lowest power plate and the lowest ground plate within the capacitor, in which the power conductor and the ground reference are connected to the capacitor within the perimeter formed by the lowest power plate and the lowest ground plate.

4. The combination of claim 3, in which the power conductor and the ground reference are connected to the capacitor near the center of the perimeter of the capacitor.

5. The combination of claim 3, in which a distance from an electrical equivalent of one of the power plate and the ground plate to an electrical equivalent of the capacitor is less than approximately four thousandths of an inch.

6. The combination of claim 5, in which the distance is approximately 0.3 thousandths of an inch.

7. An electronic system, comprising a power source; a microprocessor electrically connected to the power source; a capacitor electrically connected between the microprocessor and the power source, the capacitor comprising a group of multiple power plates alternating with a group of multiple ground plates, the group of multiple power plates including a lowest power plate and the group of multiple ground plates including a lowest ground plate, a side electrode for each group of alternating plates that connects all members of each respective group of alternating plates to each other, and dielectric material surrounding both groups of alternating plates and the side electrodes; in which the microprocessor and power source are connected to the capacitor by at least one electrical connection within the perimeter of the cross section of the capacitor to the lowest power plate of the capacitor, and at least one electrical connection within the perimeter of the cross section of the capacitor to the lowest ground plate of the capacitor, in which the electrical connections between the microprocessor and power source and the capacitor are located within the perimeter formed by the lowest power plate and the lowest ground plate.

8. The system of claim 7, in which the electrical connections between the microprocessor and power source and the capacitor are located near the center of the perimeter of the capacitor.

9. The system of claim 7, in which a distance from an electrical equivalent of one of the power plate and the ground plate to an electrical equivalent of the capacitor is less than approximately four thousandths of an inch.

10. The system of claim 9, in which the distance is approximately 0.3 thousandths of an inch.

* * * * *